UNITED STATES PATENT OFFICE.

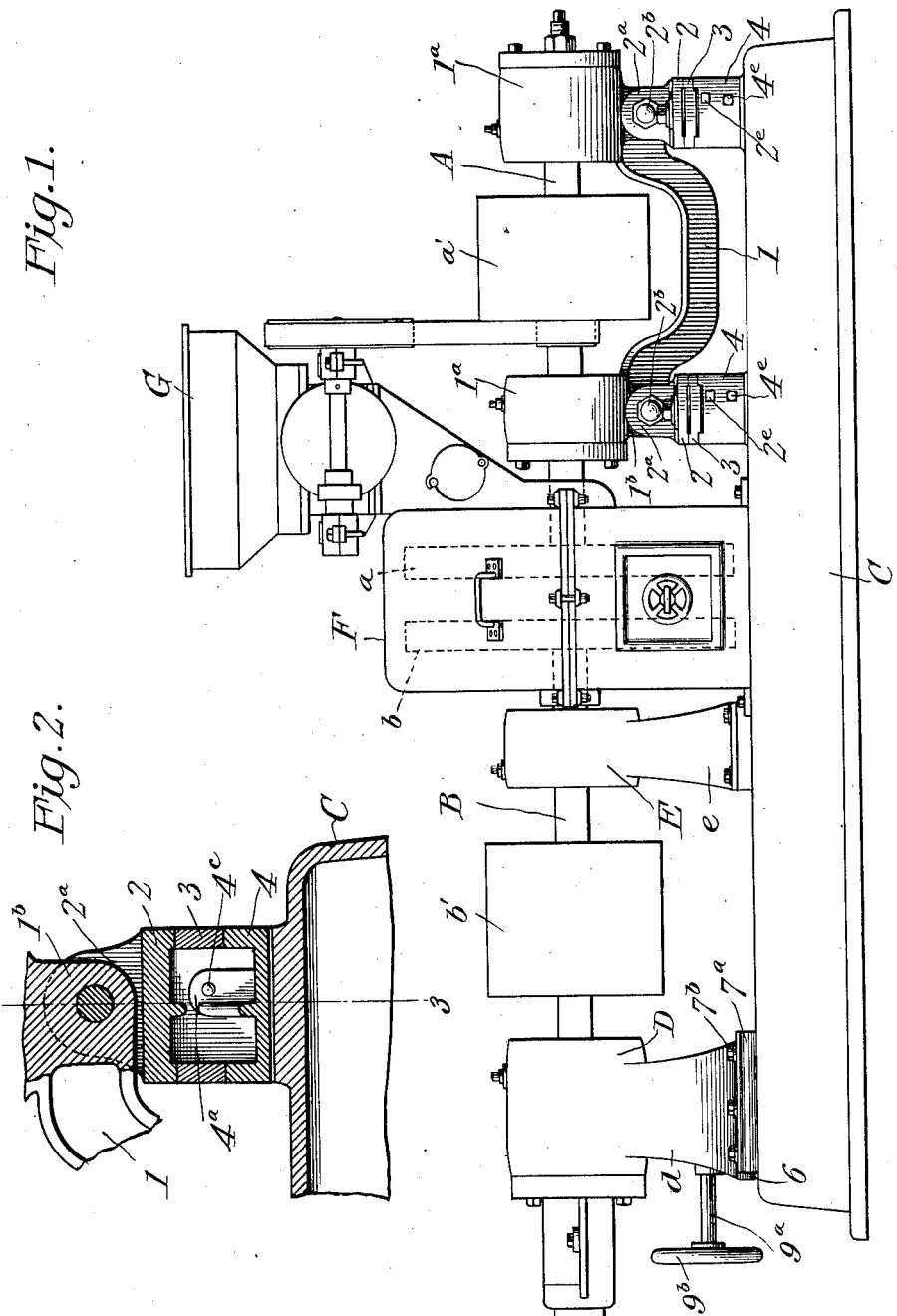

CHANDOS ROY DIMM, OF MUNCY, PENNSYLVANIA.

BEARING FOR GRINDING-MILLS.

1,093,688.  Specification of Letters Patent.  Patented Apr. 21, 1914.

Application filed September 28, 1911. Serial No. 651,877.

*To all whom it may concern:*

Be it known that I, CHANDOS R. DIMM, of Muncy, in the county of Lycoming and State of Pennsylvania, have invented certain new and useful Improvements in Bearings for Grinding-Mills; and I hereby declare that the following is a full, clear, and exact description thereof, reference being had to the accompanying drawings, which form part of this specification.

This invention is an improvement in grinding mills of that class in which the grinding is effected by means of two disks or runner heads rotating in opposite directions; such for example as shown in Patent No. 805,933; and the objects of the present invention are to provide novel means for insuring the exact axial alinement and facial parallelism of the grinding disks; to provide novel means for adjusting one of said disks and its shaft vertically and horizontally; and to provide novel means for adjusting the other of said disks axially to regulate the distance between the faces of the disks when in operative position.

I will explain the invention fully with reference to the machine illustrated in the accompanying drawings and summarize in the claims the essential features of the present invention for which protection is desired.

Figure 3:
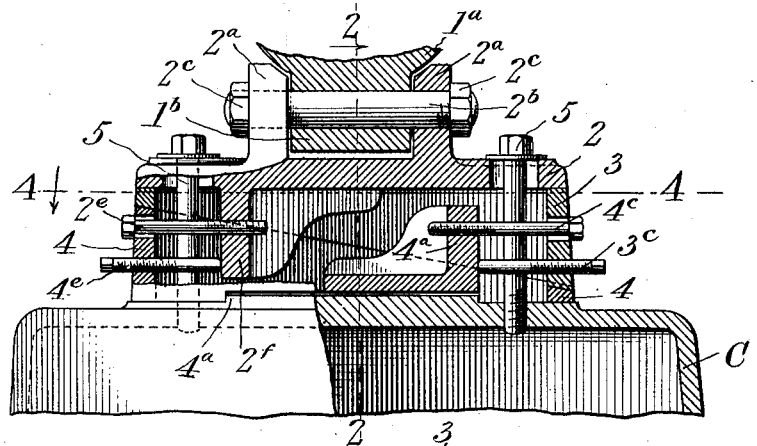
Figure 4:
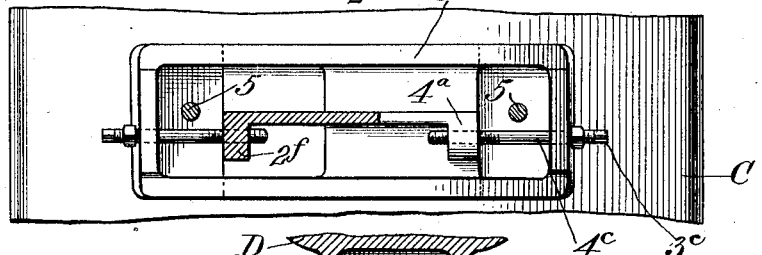
Figure 5:
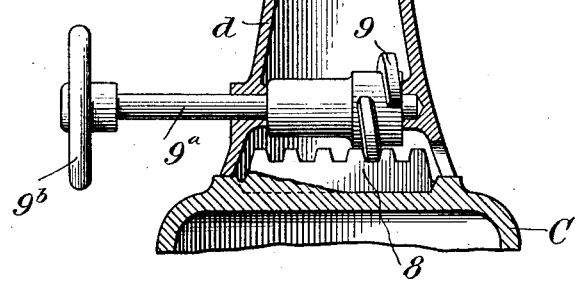
Figure 6:
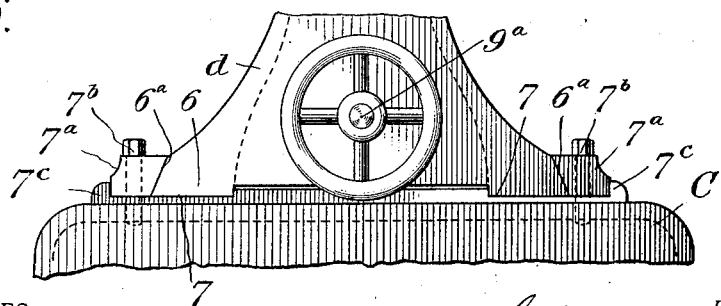

In the drawings—Figure 1 is a side elevation of the complete mill. Fig. 2 is an enlarged transverse section through the adjustable supports of the yoke carrying the bearing of one grinding disk shaft, on line 2—2, Fig. 3. Fig. 3 is an enlarged longitudinal section through such carrier on line 3—3, Fig. 2. Fig. 4 is a sectional plan view on line 4—4, Fig. 3. Fig. 5 is an enlarged longitudinal sectional view through the devices for longitudinally adjusting the other shaft. Fig. 6 is an end view of Fig. 5.

In the drawings, A and B represents the axially alined shafts of the opposed grinding disks $a$, $b$. The shaft A is journaled in bearings $1^a$ rigidly connected to the ends of a yoke 1, and preferably formed integral with said yoke. This yoke is adjustably supported, by means hereinafter described, upon the base C of the machine. The shaft B is journaled in bearings D, E, attached to standards $d$ and $e$ which are respectively supported upon the base C. The shafts A, B, may be provided with pulleys $a'$, $b'$ respectively by which they may be belted to any suitable drivers, not shown. The disks $a$, $b$ are inclosed within a housing F and the grain may be fed to the disk from a hopper G, all substantially as indicated in Fig. 1 of the drawings.

All the aforesaid parts,—with the exception of the means for supporting and adjusting the yoke 1 and the means for adjusting the bearing D,—may be constructed substantially as described in Patent #805,933 aforesaid or of any other desired construction, the same not forming part of the present invention, which relates more particularly to the means for supporting and adjusting the yoke 1, and the means for adjusting the bearing D.

The yoke 1, as shown in the drawings, connecting the two bearings $1^a$, $1^a$ of the shaft A, keeps these two bearings fixedly in alinement, and prevents binding of the shaft when it becomes necessary to adjust either bearing in order to bring the shaft A at one end of the mill into exact alinement with the shaft B at the other end thereof or to bring the disks $a$, $b$ into exact parallelism.

The yoke 1 is preferably pivotally connected at each end to a supporting plate 2; the yoke having a head $1^b$ at its ends which are adapted to fit closely between upstanding lugs $2^a$ on the upper side of the plate 2; and the lugs $2^a$ and the heads $1^b$ of the yoke, at each end thereof, are transfixed by a bolt $2^b$, which is preferably provided with large nuts $2^c$ on one or both ends, so that the bolts can be drawn up very tightly and against the head of the yoke so that there is no chance for any lost motion or lateral play of the yoke between the lugs $2^a$.

It will be seen that each end of the yoke is pivotally hung on a bolt $2^b$, the object of this is to enable either end of the yoke to be adjusted as hereinafter described; and when either end of the yoke is adjusted both ends of the yoke and both bearings $1^a$ will be automatically adjusted to the new positions, necessitated by the adjustment; the yoke swinging or hinging not only on the bolt at that end to which the adjustment is directly applied but at both ends, thereby enabling the yoke to maintain the bearings $1^a$ in absolutely accurate alinement without danger of cramping the shaft A journaled therein.

In order to adjust either end of the yoke and the bearings thereon, each plate 2 is adjustably supported upon base C by means of two wedge plates or castings designated as 3 and 4 in the drawings. The wedge plate 4, which I term a stationary wedge, is preferably made in the form of a rectangular frame, see Figs. 3 and 4, which is directly supported upon the base C and lies transversely thereof; and the underside of the stationary wedge plate 4 being recessed as shown at 4ᵃ is adapted to engage a projection on the base C to prevent lateral movement of the piece 4. The wedge plate 3 is also frame-like, and is fitted over and upon the stationary wedge plate 4; the meeting faces of these wedge plates being inclined so that by shifting wedge plate 3 longitudinally of wedge plate 4 the former may be raised or lowered. The wedge plate 3 may be shifted longitudinally of wedge plate 4 by means of adjusting bolts 3ᶜ and 4ᶜ. The bolt 3ᶜ is tapped through one end wall of the wedge plate 3 and its inner end engages against an abutment or partition 4ᵃ within and forming part of the wedge plate 4. The bolt 4ᶜ passes loosely through an opening in the end wall of the wedge plate 3 and its inner end is threaded to engage a correspondingly threaded opening in the abutment 4ᵃ, see Fig. 3.

The construction is such that by loosening one bolt and tightening the other the wedge plate 3 may be adjusted longitudinally of the wedge plate 4, and when being thus adjusted it is simultaneously raised or lowered, and thereby vertically raises or lowers the bearing plate 2 supported thereupon; and correspondingly raises or lowers the end of the yoke 1 attached to said bearing plate.

In order to enable each end of the yoke (or bearings 1ᵃ) to be adjusted laterally or transversely of base C, the bearing plate 2 is preferably provided on its under side with a depending partition or abutment 2ᶠ (Figs. 3 and 4); and this abutment is engaged by a tap bolt 2ᵉ and set bolt 4ᵉ. Tap bolt 2ᵉ is passed through an aperture in the larger end of the fixed wedge plate 4 and is tapped into an aperture in the abutment 2ᶠ. While the bolt 4ᵉ is tapped through a threaded opening in the larger end of the stationary wedge plate 4 and abuts against the outer side of the abutment 2ᶠ. By loosening one of these bolts and tightening the other the plate 2 can be shifted longitudinally of the wedge plate 3, thus adjusting the yoke and the shaft carried thereby horizontally. When the adjustments have been effected the bearings are securely locked in position by means of the large bolts 5 which pass through openings in the top plate 2 and are tapped into threaded openings in the base C as shown in Fig. 3.

If it is desired to raise either bearing 1ᵃ, the two large bolts 5 adjacent such bearing should be loosened; then bolt 3ᶜ is loosened, and bolt 4ᶜ turned so as to move the wedge plate 3 up the incline, and consequently raise the bearing. If on the other hand the operator desired to lower the bearing, set bolt 4ᶜ may be loosened and bolt 3ᶜ turned so as to draw the wedge plate 3 down the incline, thus lowering plate 2. The bolts 3ᶜ, 4ᶜ therefore provide for the vertical adjustment of plate 2. The bolts 2ᵉ, 4ᵉ provide for the horizontal adjustment of the bearing plate 2 transversely of base C. This construction provides both a vertical and lateral adjustment for each end of the yoke and having the yoke mounted on a pivotal bolt at each end allows the plates 2 supporting this yoke to rest rigidly on the wedge plates the full width of them, no matter at what angle the shaft may be adjusted.

Another feature of the invention is the means for longitudinally adjusting the shaft B and its grinding disk or runner head b toward or from the shaft A and its runner head or disk a. For this purpose the adjustable bearing D is mounted to slide longitudinally on the base C. As shown in Figs. 5 and 6 the standard d supporting bearing D is provided at its lower edge with shallow base flanges 6 which slidably engage longitudinal channels 7 in the base. The outer faces of the flanges 6 are inwardly inclined as shown at 6ᵃ and engage oppositely inclined faces of key bars 7ᵃ which are securely fastened to the base C, at opposite sides of the standard d, by bolts 7ᵇ. The bars 7ᵃ are fitted in the outer sides of channels 7 and are braced by flanges 7ᶜ formed on the base at the outer sides of said channels, see Fig. 6.

Formed on or secured to the base C intermediate the channels 7, and lying within the standard d (which is hollow), is a rack bar 8 adapted to be engaged by a worm 9 on a shaft 9ᵃ journaled in the standard d and provided on its outer end with a hand wheel 9ᵇ. By turning this hand wheel worm 9 will be rotated and by reason of its engagement with rack 8 will cause standard d to move longitudinally of the base, and thus shift shaft B longitudinally so as to separate or approach the grinding disks or the runner heads a, b. The rack 8 is preferably cast on the base of the machine. It will be observed that the end bearing D of the shaft B is thus slidably supported on the base and the adjustment for this bearing instead of being located close to the shaft is brought down near to the base C, and the worm provides a very positive and powerful means for adjusting the bearing.

What I claim is:

1. In a grinding mill the combination of a shaft, bearings for said shaft, a yoke rigidly connecting said bearings, bearing plates pivotally connected to each end of the yoke, and means for vertically adjusting either bearing plate.

2. In a grinding mill the combination of a shaft, bearings for said shaft, a yoke rigidly connecting said bearings, a bearing plate pivotally connected to each end of the yoke, means for vertically adjusting either bearing plate, and means for horizontally adjusting either bearing plate.

3. In a grinding mill the combination of a shaft, bearings therefor, a yoke rigidly connecting the bearings, a bearing plate at each end of the yoke, a bolt pivotally connecting each end of the yoke to the adjacent bearing plate, and adjustable wedges for vertically adjusting said bearing plates.

4. In a grinding mill the combination of a shaft, bearings therefor, a yoke rigidly connecting said bearings, a bearing plate at each end of the yoke, bolts pivotally connecting the ends of the yoke to said bearing plates, and adjustable wedges for vertically adjusting said bearing plates, and means for horizontally adjusting either bearing plate on its supporting wedges.

5. In a grinding mill the combination of a bearing, a bearing plate in which the bearing is mounted, a base, a wedge plate fixed on the base, an adjustable wedge plate mounted upon the fixed wedge plate, means for adjusting the movable wedge plate upon the fixed wedge plate, and means for adjusting the bearing plate longitudinally of the wedge plates.

6. In a grinding mill the combination of a pair of bearings, a shaft journaled therein, a yoke rigidly connecting said bearings, a bearing plate at each end of the yoke, and bolts pivotally connecting the ends of the yoke to said bearing plates; with oppositely inclined wedge plates for supporting each bearing plate, bolts for relatively adjusting the wedge plates to raise or lower the bearing plates; bolts for adjusting the bearing plates horizontally on the supporting wedges; and means for firmly clamping the bearing and wedge plates in position when adjusted.

In testimony that I claim the foregoing as my own, I affix my signature in presence of two witnesses.

CHANDOS ROY DIMM.

Witnesses:
 ROBT. K. REEDER,
 GEO. A. BATDORFF.

Copies of this patent may be obtained for five cents each, by addressing the "Commissioner of Patents, Washington, D. C."